(12) United States Patent
Rupnik et al.

(10) Patent No.: US 8,706,321 B1
(45) Date of Patent: Apr. 22, 2014

(54) LONGITUDINAL AND VERTICAL GUST FEED FORWARD COMPENSATION USING LATERAL CONTROL SURFACES

(75) Inventors: Brian K. Rupnik, Seattle, WA (US); Sean J. Flannigan, Seattle, WA (US)

(73) Assignee: The Boeing Company, Chicago, IL (US)

( * ) Notice: Subject to any disclaimer, the term of this patent is extended or adjusted under 35 U.S.C. 154(b) by 173 days.

(21) Appl. No.: 13/592,631

(22) Filed: Aug. 23, 2012

Related U.S. Application Data

(62) Division of application No. 11/944,146, filed on Nov. 21, 2007, now Pat. No. 8,275,496.

(51) Int. Cl.
- G05D 1/06 (2006.01)
- B64C 13/16 (2006.01)
- G05D 1/02 (2006.01)
- G05D 1/04 (2006.01)

(52) U.S. Cl.
CPC .............. *G05D 1/0204* (2013.01); *G05D 1/046* (2013.01); *G05D 1/0623* (2013.01); *B64C 13/16* (2013.01)
USPC .......... 701/10; 701/8; 701/6; 701/7; 244/203; 244/76 C

(58) Field of Classification Search
USPC .......................................................... 701/10
See application file for complete search history.

(56) References Cited

U.S. PATENT DOCUMENTS

| | | | | |
|---|---|---|---|---|
| 2,620,150 A * | 12/1952 | Atwood et al. | | 244/82 |
| 2,621,873 A * | 12/1952 | Gordon | | 244/82 |
| 2,626,115 A * | 1/1953 | Atwood et al. | | 244/191 |
| 2,745,613 A * | 5/1956 | Oswald et al. | | 244/76 R |
| 2,962,243 A * | 11/1960 | Coleman et al. | | 244/177 |
| 2,985,409 A * | 5/1961 | Atwood et al. | | 244/191 |
| 3,215,374 A * | 11/1965 | Olshausen | | 244/191 |
| 3,240,447 A * | 3/1966 | Olshausen | | 244/177 |
| 3,327,972 A * | 6/1967 | Greene | | 244/188 |
| 3,412,959 A * | 11/1968 | Wachter | | 244/52 |
| 3,814,912 A * | 6/1974 | Manke et al. | | 701/6 |
| 4,354,237 A | 10/1982 | Lambregts et al. | | |
| 4,357,661 A | 11/1982 | Lambregts et al. | | |
| 4,419,732 A | 12/1983 | Lambregts et al. | | |
| 4,530,060 A * | 7/1985 | Greene | | 701/16 |
| 4,591,113 A * | 5/1986 | Mabey | | 244/76 C |
| 4,863,120 A | 9/1989 | Zweifel et al. | | |
| 4,947,164 A * | 8/1990 | Bateman | | 340/968 |
| 5,053,767 A * | 10/1991 | Zweifel et al. | | 340/968 |
| 5,175,551 A * | 12/1992 | Rubin | | 342/26 D |
| 5,493,293 A * | 2/1996 | Hansen et al. | | 340/968 |
| 6,188,330 B1 * | 2/2001 | Glover | | 340/968 |
| 8,000,847 B2 * | 8/2011 | Shue | | 701/10 |
| 2008/0046137 A1 * | 2/2008 | Shue | | 701/10 |
| 2010/0171002 A1 * | 7/2010 | Hahn | | 244/76 C |

FOREIGN PATENT DOCUMENTS

EP  2063338 A2  5/2009

* cited by examiner

*Primary Examiner* — Shelley Chen
(74) *Attorney, Agent, or Firm* — Klintworth & Rozenblat IP LLC

(57) ABSTRACT

In one embodiment of a method to reduce vertical position errors of an aircraft, a disturbance input acting on the aircraft may be determined. The magnitude of the disturbance may be converted into a delta lift command if the magnitude of the disturbance is outside a criteria. The delta lift command may be post processed. The delta lift command may be converted into symmetric lateral surface position commands for control surfaces. The symmetric lateral surface position commands may be communicated to lateral control surface actuators to move the control surfaces according to the symmetric lateral surface position commands.

12 Claims, 4 Drawing Sheets

LONGITUDINAL AND VERTICAL GUST FEED FORWARD COMPENSATION USING LATERAL CONTROL SURFACES

CROSS-REFERENCE TO RELATED APPLICATIONS

This application claims priority to and is a divisional of U.S. patent application Ser. No. 11/944,146 entitled 'Longitudinal And Vertical Gust Feed Forward Compensation Using Lateral Control Surfaces' and filed Nov. 21, 2007, which is hereby incorporated by reference in its entirety.

BACKGROUND

The disclosure relates to aircraft flight control systems and specifically to the automatic control of an aircraft's flight path. Automatic pilot systems are widely used in the aviation industry to provide precision guidance to aircraft. Conventional control systems typically utilize the elevator as the control surface for effecting changes in the aircraft's vertical path. One objective of the disclosure is to provide wind gust disturbance rejection in order to enhance the precision of vertical path control afforded by a conventional pitch control systems coupled with an automatic pilot system, both during landing and non-landing flight situations.

As a representative example, an automatic landing is a vertical path tracking task that requires precise vertical path control in order to achieve acceptable performance. Automatic landing capability is required for operations in the most severe low visibility weather, referred to as Category IIIB low weather minima, and is used in less restrictive weather minimums to enhance safety and reduce flight crew work load. An Automatic Landing System (ALS) provides the precise vertical and lateral path guidance necessary to meet the stringent performance requirements specified for low weather minimum operations.

The vertical path guidance provided by an ALS includes both glide path control and the flare maneuver. Precise control of vertical position relative to the desired vertical path is essential in order to achieve the performance required for Category III operations. The glide path provides the established descent gradient and longitudinal position reference for final approach flight path guidance. The flare maneuver provides the transition from the glide path to touchdown at the desired location on the runway. Ideally, the ALS will land the aircraft at the same point on the runway regardless of environment or facility. In other words, the design must be very robust given the wide range of environmental conditions, terrain, and runway characteristics that the aircraft will be subjected to during automatic landings. However, in practice the vertical path tracking provided by the ALS is significantly affected by shearing winds, terrain, and runway characteristics. Any enhancement of an existing autopilot design that improves vertical path tracking will reduce the impact of the aforementioned disturbances during automatic landing operations.

For automatic landings, the autopilot used in airplanes such as the 777, 757, 767, and 747-400 utilizes a vertical position control law design to provide glide path control and the flare maneuver. The elevator command is generated with an elevator vertical position feedback control system. The vertical position control law design produces a pitch attitude command that is proportional to the altitude error and altitude rate error and the integral of the altitude error. The design is tuned to provide accurate vertical path tracking with acceptable stability characteristics. One problem with relying solely on an elevator feedback control system for vertical position control is that high gains are usually required to achieve the desired vertical path tracking accuracy. However, excessively high gains in the elevator feedback control system can compromise the overall system stability, potentially resulting in interaction with aircraft structural modes. High gains can also result in the pitch activity that is objectionable to the flight crew.

Autopilots typically utilize a predictive or elevator feed forward compensation of some sort in combination with elevator feedback control to achieve disturbance rejection. This combination of feed forward compensation and feedback control allow performance objectives to be met without restoring to excessively high and potentially destabilizing feedback gains. The types of elevator feed forward compensation utilized are typically either short term moment compensation or long term force compensation.

For short term moment compensation, a control surface command (elevator) is generated such that a moment is created that cancels the moment predicted to be generated by the disturbance. For long term force compensation, a pitch attitude command is generated to counteract the steady state trim changes due to a disturbance. Short term moment compensation tends to limit pitch attitude change in response to a disturbance, whereas long term force compensation tends to generate pitch attitude change in response to a disturbance. Short term moment compensation is used for balancing pitching moments due to changes in stabilizer, and changes in thrust and ground effects, but is not very effective for dealing with vertical path disturbance due to changing winds. Long term for compensation, on the other hand, is quite effective in countering the disturbances due to changing winds. However, during the flare maneuver, the pitch attitude changes resulting from long term force compensation tend to result in undesirable pitch activity from a fight crew acceptability standpoint.

During a landing there are also geometrical constraints that need to be considered. The pitch attitude of the airplane must be limited to prevent ground contact of the nose landing gear prior to the main landing gear and ground contact of the aft body (tail strike). While limiting the pitch attitude within the geometrical constraints reduces the probability of a nose gear first contact and tail strike during an automatic landing, the ability of the autopilot to maintain the commanded vertical path can be diminished by these geometrical constraints. For example, during a flare maneuver, the geometrical constraints may prevent the autopilot from maneuvering as aggressively in response to the vertical path upset caused by shearing winds.

A method for reducing vertical position errors of an aircraft is needed to decrease one or more problems associated with one or more of the existing methods.

SUMMARY

In one aspect of the disclosure, a method is disclosed for reducing vertical position errors of an aircraft. In one step, a disturbance input acting on the aircraft may be determined. In another step, a determination may be made as to whether the magnitude of the disturbance exceeds a criteria. In still another step, no more steps of the method may be followed if the magnitude of the disturbance is not outside the criteria. The magnitude of the disturbance may be converted into a delta lift command if the magnitude of the disturbance is outside the criteria. In yet another step, the delta lift command may be post processed. In an additional step, the delta lift command may be converted into symmetric lateral surface position commands for control surfaces. In another step, the symmetric lateral surface position commands may be communicated to lateral control surface actuators to move the control surfaces according to the symmetric lateral surface position commands.

In another aspect of the disclosure, a method is disclosed for reducing vertical position errors of an aircraft due to wind gusts. In one step, a magnitude of a vertical wind gust acting on the aircraft may be determined using an angle of attack rate and a magnitude of a longitudinal wind gust acting on the aircraft may be determined using a true airspeed rate. In an additional step, a vertical wind gust signal and a longitudinal wind gust signal may be passed through a criteria, and no more steps of the method may be followed if the vertical wind gust signal and the longitudinal wind gust signal are not outside the criteria. In another step, the vertical wind gust signal and the longitudinal wind gust signal may be multiplied by at least one gain signal to produce two delta lift commands. In an additional step, the two delta lift commands may be summed to produce a single delta lift command. In yet another step, the single delta lift command may be used in unison with a conventional vertical position feedback elevator control loop to compensate for wind gusts in order to maintain a commanded position of the aircraft.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
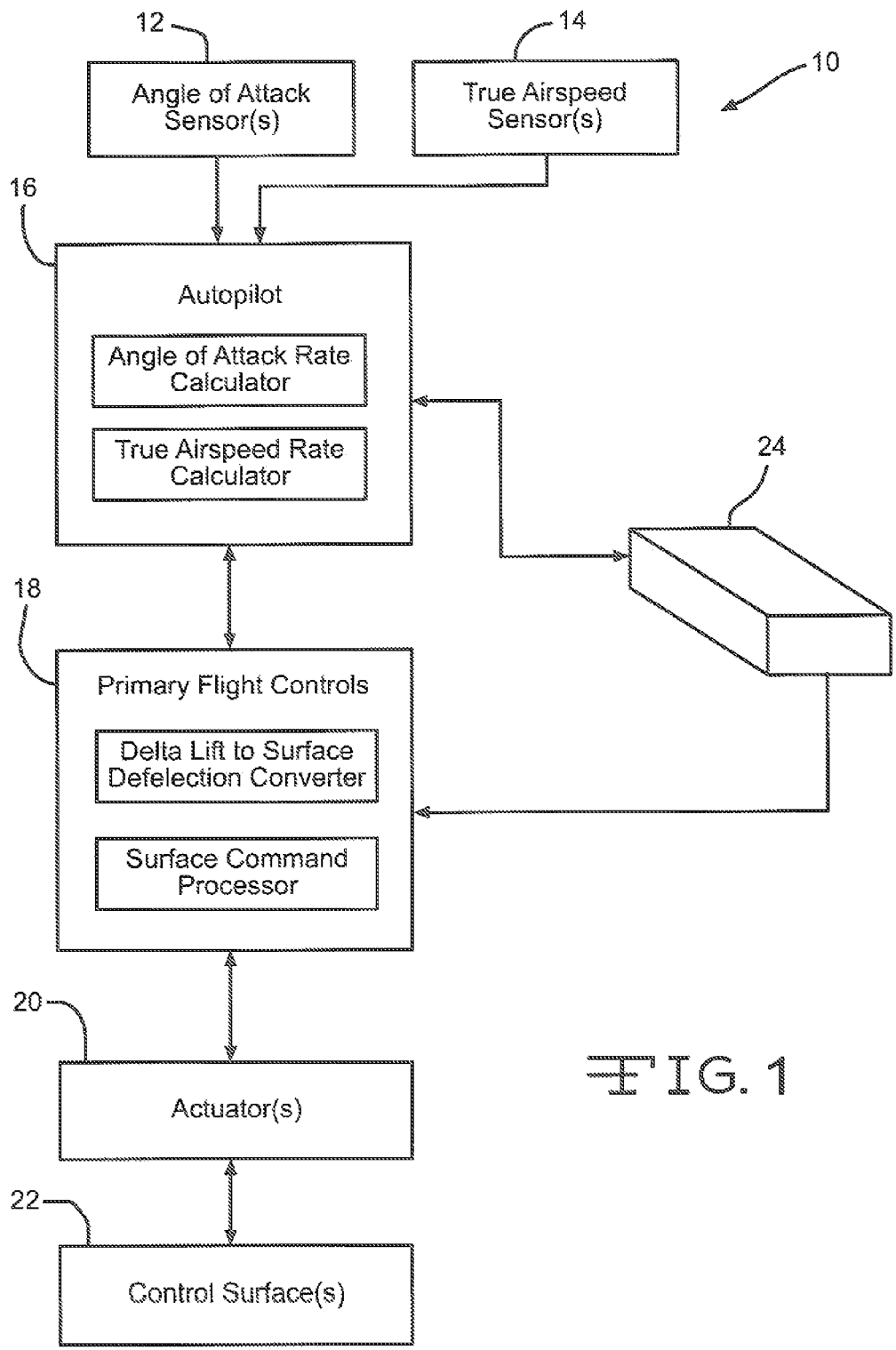
FIG. 1 shows a system block diagram which may be used under one embodiment of the disclosure.

FIG. 1 shows a system block diagram 10 which may be used under one embodiment of the disclosure. The system 10 may include one or more angle of attack sensor 12, one or more true airspeed sensor 14, an autopilot system 16, a flight control 18, one or more actuator 20, one or more control surface 22, and one or more computer 24.

The angle of attack sensor 12 may be adapted to sense an angle of attack of an aircraft. The true airspeed sensor 14 may be adapted to sense an airspeed of an aircraft. The autopilot system 16 may comprise an angle of attack rate calculator, a true airspeed rate calculator, and/or other types of autopilot devices. The flight control system 18 may comprise one or more of a delta lift to surface deflection converter, a surface command processor, and/or other types of flight controls. The one or more actuators 20 may comprise one or more devices that may be used to move the control surfaces 22. The one or more computers 24 may comprise a feed forward compensation symmetric lateral control surface deflection (or direct lift) computer. The one or more computers 24 may further comprise one or more of a processor, a memory, an autopilot interface module, a flight control interface module, and/or other types of computer systems. In other embodiments, the system 10 may include varying sensors, systems, and/or devices.

Figure 2:
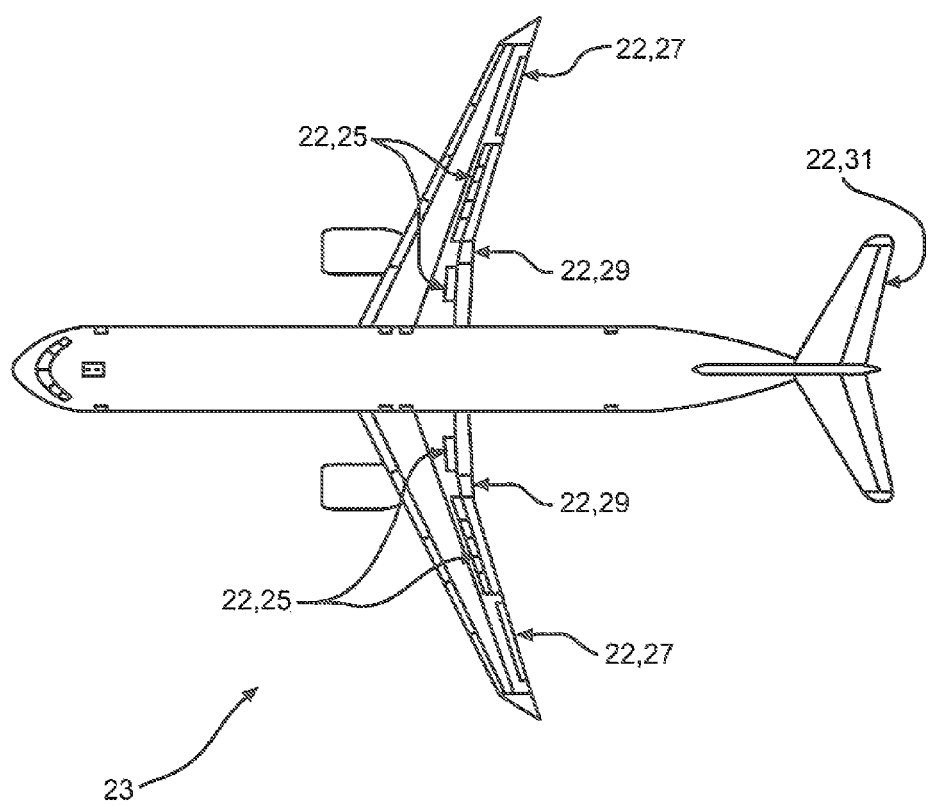
FIG. 2 shows a top view of one embodiment of control surfaces of an aircraft.

As shown in FIG. 2, which shows a top view of one embodiment of control surfaces 22 of an aircraft 23, the control surfaces 22 may comprise spoilers 25, ailerons 27, flaperons 29, an elevator 31, and/or other types of control surfaces. The spoilers 25 may be deflected asymmetrically for lateral control, and/or can be symmetrically deflected for longitudinal control, and/or lift reduction. The ailerons 27 may be deflected asymmetrically for lateral control, and/or may be symmetrically deflected for longitudinal control. The flaperons 29 may be deflected asymmetrically for lateral control, and/or may be symmetrically deflected for longitudinal control and/or lift generation. The elevator 31 may comprise a longitudinal control surface.

Figure 3:
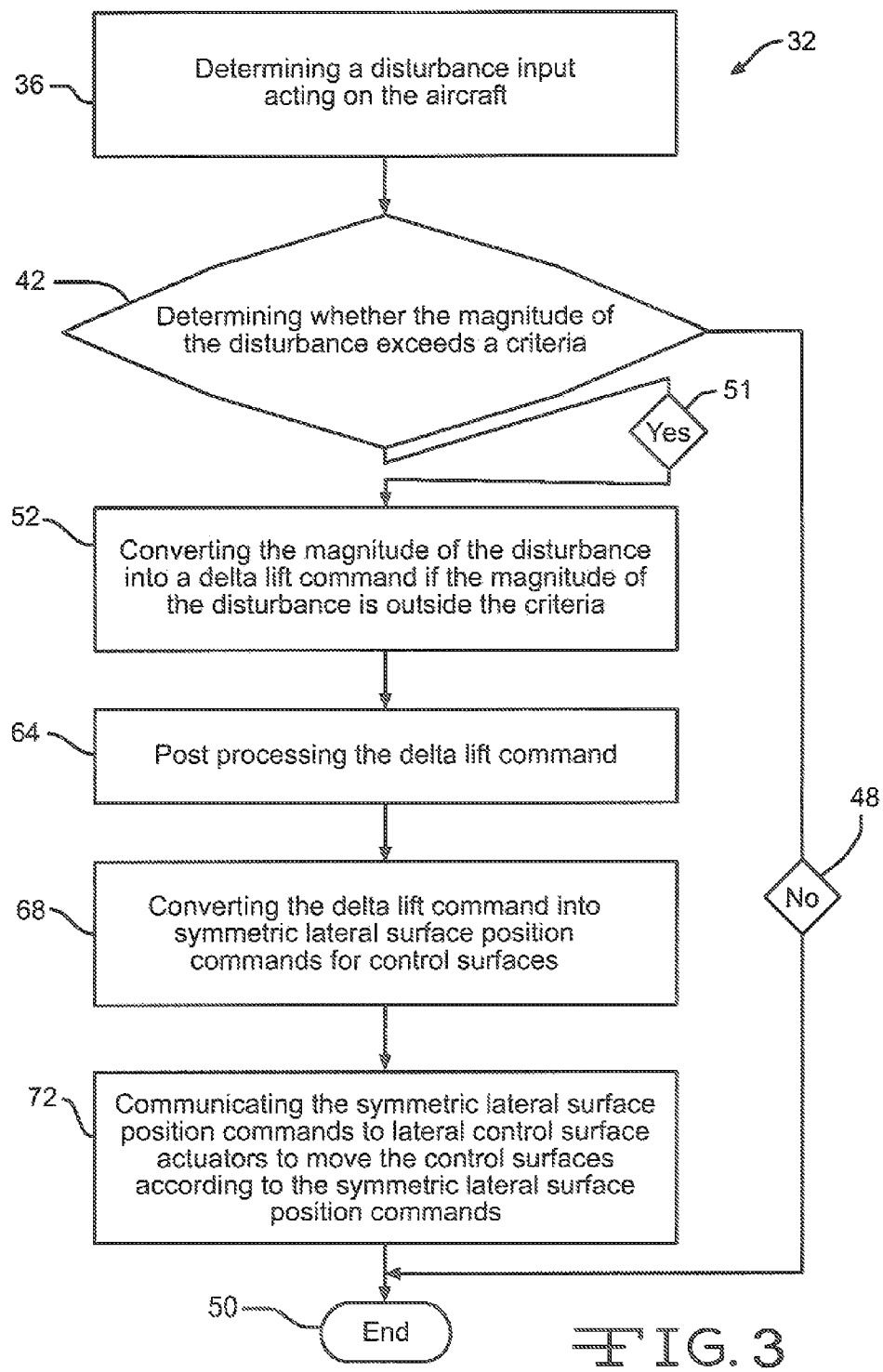
FIG. 3 shows a flowchart of one embodiment of a method for reducing vertical position errors in an aircraft.
Figure 4:
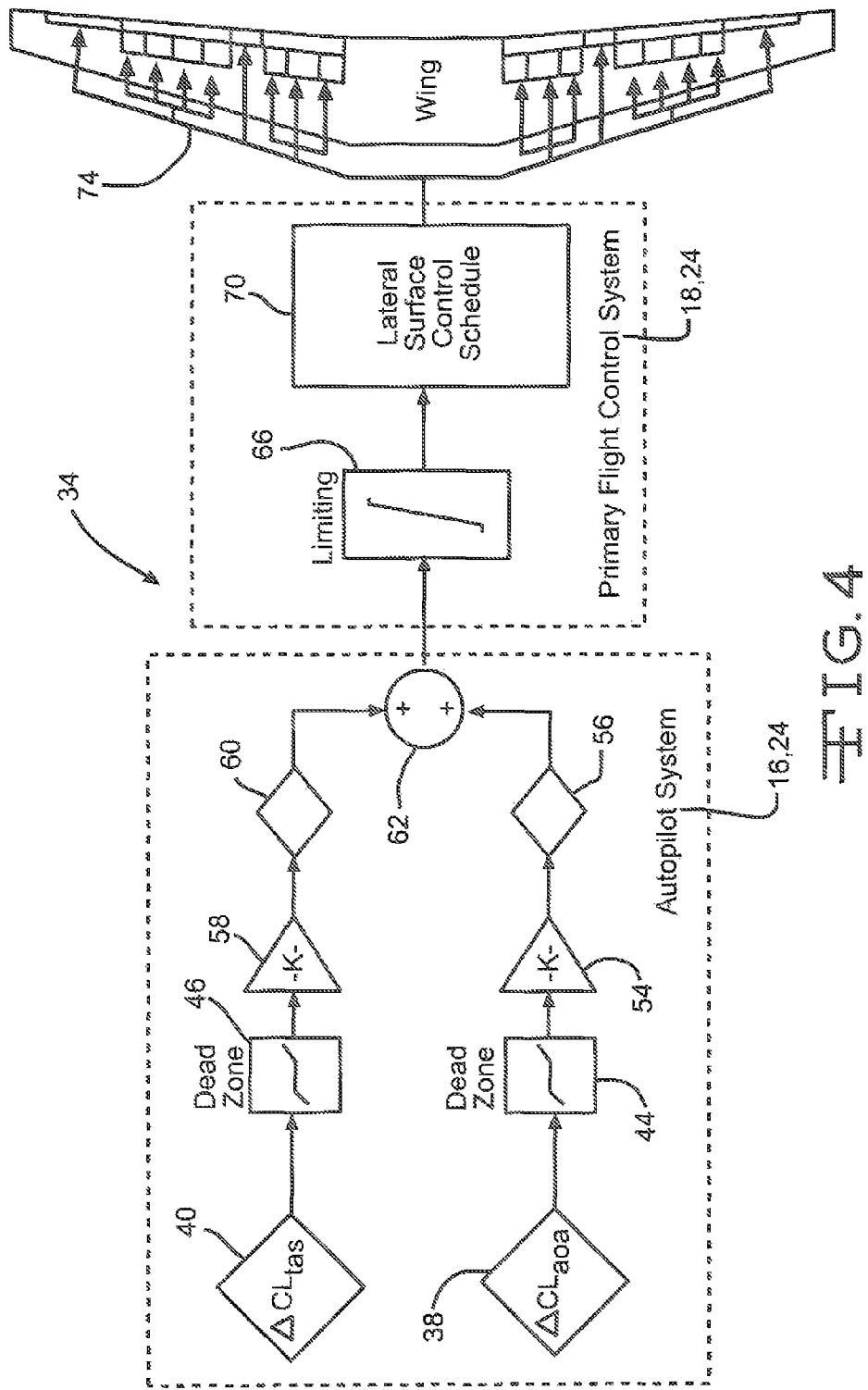
FIG. 4 shows one embodiment of a block diagram which may be followed to implement the method of FIG. 3.

FIG. 3 shows a flowchart of one embodiment of a method 32 for reducing vertical position errors in the aircraft 23 of FIG. 2. FIG. 4 shows one embodiment of a block diagram 34 which may be followed to implement the method 32 of FIG. 3. As shown in FIGS. 1 and 3, in step 36 a disturbance input, such as longitudinal and/or vertical wind gusts acting on the aircraft 23, may be determined. This determination may be done using aircraft sensors which may comprise the angle of attack sensor 12, the true airspeed sensor 14, and/or other type of aircraft sensors. The aircraft sensors may be used to estimate the longitudinal and vertical wind gusts or other disturbances acting on the aircraft 23 using the computer 24, the autopilot system 16, the flight control system 18, and/or signal processing.

Step 36 may comprise, as shown in FIGS. 1 and 4, determining the vertical gust 38 using the angle of attack rate as determined by the angle of attack sensor 12, and/or determining the longitudinal gust 40 using the true airspeed rate as determined by the true airspeed sensor 14. The autopilot system 16, flight control system 18, and/or computer 24 may be used to make this determination.

As shown in FIGS. 1 and 3, in step 42 a determination may be made as to whether the magnitude of the disturbance is outside a criteria, and therefore sufficiently large to warrant a deflection of the lateral control surfaces 22. This determination may be made using the computer 24, the flight control system 18, and/or the autopilot system 16. Factors such as actuator wear, surface fatigue, system stability, and/or other factors may be considered in setting the criteria, which may comprise a deadzone, a deadzone filter, a filter, and/or other type of criteria. Step 42 may comprise, as shown in FIGS. 1 and 4, sending/passing the vertical gust signal 38 through deadzone 44 and/or the longitudinal gust signal 40 through deadzone 46 using the autopilot system 16, the flight control system 18, and/or the computer 24.

As shown in FIG. 3, if the magnitude of the disturbance is not outside the criteria, then in step 48 the method may conclude/end 50 without doing/completing any more steps of the method 32. If the magnitude of the disturbance is outside the criteria, as shown in step 51, then in step 52 the magnitude of the disturbance may be converted into a delta lift command using the autopilot system 16, the flight control system 18, and/or the computer 24 of FIG. 1. Step 52 may comprise, as shown in FIG. 4, using the autopilot system 16, the flight control system 18, and/or the computer 24 to multiply the vertical gust signal 38 by a first gain signal 54 to produce a first delta lift command 56, to multiply the longitudinal gust signal 40 by a second gain signal 58 to produce a second delta lift command 60, and to sum the first delta lift command 56 and the second delta lift command 60 to obtain the delta lift command 62. The delta lift command 62 may be proportional to the magnitude of the disturbance. The first and second gain signals 54 and 58 may be identical. In other embodiments, the first and second gain signals 54 and 58 may vary.

As shown in FIG. 3, in step 64 the delta lift command 62 may be post processed to prevent command saturation. The post processing may comprise limiting, filtering, and/or smoothing of the delta lift command 62. The post processing may be done utilizing at least one of the autopilot system 16, the flight control system 18, and/or the computer 24 of FIG. 1. Step 64 may comprise, as shown in FIG. 4, filtering/smoothing/and/or limiting 66 the delta lift command 62 using the flight control system 18, autopilot system 16, and/or computer 24. This limiting/filtering/and/or smoothing may prevent commanding more delta lift than is available with the applicable lateral control surfaces 22 shown in FIG. 2. If any of the input signals are exceptionally noisy, then appropriate filtering of the delta lift coefficient command 62 may be applied. Other sorts of limiting, smoothing, and/or filtering may also be applied as appropriate.

As shown in FIGS. 1-4, in step 68 the delta lift command 62, which may have been smoothed/filtered/and/or limited in step 64, may then be converted into symmetric lateral surface position commands for the control surfaces 22. This may be done using the computer 24, the autopilot system 16, and/or the flight control system 18. The symmetric lateral surface position commands may comprise symmetric lateral control surface commands for the control surfaces 22. Step 68 may comprise, as shown in FIG. 4, converting the delta lift command 62 (which may have been limited/filtered/and/or smoothed) into symmetric lateral surface position commands 70 using the flight control system 18, the autopilot system 16, and/or the computer 24.

As shown in FIGS. 1, 2, and 3, in step 72, the symmetric lateral surface position commands may be communicated to the lateral control surface actuators 20 which may control/move the control surfaces 22 according to the lateral surface position commands. This may be done using the flight control system 18, the autopilot system 16, and/or the computer 24. The symmetric deflections of the control surfaces 22 may create a change in lift of the aircraft 23 which is proportional to the disturbance, such that the effect of the disturbance is reduced or canceled. The feedback control loop may work in parallel/unison with the conventional vertical position feedback elevator control loop (the elevator command) to maintain the commanded vertical path of the aircraft 23 and to correspondingly reduce vertical position error. The method 32 may then end 50. Step 72, as shown in FIGS. 1 and 4, may comprise communicating 74 the symmetric lateral surface position commands to the lateral control surface actuators 20 to control/move the control surfaces 22 using the flight control system 18, the autopilot system 16, and/or the computer 24.

The embodiments of the disclosure may be used to enhance the accuracy of the automatic pilot vertical position command tracking task provided by one or more of the conventional longitudinal control systems. The enhancement may be achieved by using a feed forward compensator(s) to produce commands that may result in symmetric deflections of lateral control surfaces on the aircraft's wings that are proportional to the longitudinal and/or vertical wind gusts. Symmetric deflections of the wing's lateral control surfaces may result in small changes in lift to counter the vertical path disturbance caused by the gusts. In such manner, vertical position command tracking may be improved during an automatic landing. However, the embodiments of the disclosure could be applied to any phase of flight where a vertical position control strategy is utilized.

For automatic landings, the improved vertical position command tracking achieved by one or more embodiments of the disclosure may increase the robustness and improve the performance of an existing automatic landing system. Symmetric deflections of the lateral control surfaces may produce significantly less pitching movement than elevator deflections. Therefore, one or more embodiments of the disclosure may provide a unique way to improve vertical position command tracking during an automatic landing without creating pitch activity that may be objectionable to the flight crew or requiring excessively high vertical position feedback gains that may compromise system stability. The development and certification of an automatic landing system may be a costly endeavor, requiring extensive flight testing, gain tuning, and simulation model updates. A more robust automatic landing system may be less sensitive to discrepancies between the simulation models for aerodynamic and sensors and the actual aircraft aerodynamics and sensor characteristics, and may therefore reduce the overall cost and design refinement involved in certification of the automatic landing system. Additionally, lower vertical position feedback gains may reduce the possibility of structural mode interaction.

It should be understood, of course, that the foregoing relates to exemplary embodiments of the disclosure and that modifications may be made without departing from the spirit and scope of the disclosure as set forth in the following claims.

The invention claimed is:

1. A method for reducing a vertical position error of an aircraft due to a wind gust comprising:
    determining a magnitude of a wind gust acting on an aircraft by determining the magnitude of the vertical wind gust acting on the aircraft using an angle of attack rate and determining the magnitude of the longitudinal wind gust acting on the aircraft using a true airspeed rate;
    determining if the magnitude of the wind gust is outside a criteria, and if it is doing the following:
    converting the magnitude of the wind gust into a delta lift command, defined as a change in lift command;
    using the delta lift command to compensate for the wind gust in order to maintain a commanded position of the aircraft.

2. The method of claim 1 wherein the determining if the magnitude of the wind gust is outside the criteria further comprises determining if the magnitude of the vertical wind gust and the magnitude of the longitudinal wind gust are outside the criteria.

3. The method of claim 1 wherein the converting the magnitude of the wind gust into the delta lift command, defined as the change in the lift command, further comprises multiplying a vertical wind gust signal and a longitudinal wind gust signal by at least one gain signal to produce two delta lift commands, and summing the two delta lift commands to produce a single delta lift command.

4. The method of claim 3 wherein the using the delta lift command to compensate for the wind gust in order to maintain the commanded position of the aircraft further comprises using the single delta lift command in unison with a vertical position feedback elevator control loop to compensate for the wind gust in order to maintain the commanded position of the aircraft.

5. The method of claim 1 further comprising at least one of limiting, filtering, or smoothing the delta lift command using at least one of a flight control system, an autopilot system, or a computer.

6. The method of claim 5 further comprising limiting, filtering, and smoothing the delta lift command using at least one of the flight control system, the autopilot system, or the computer.

7. The method of claim 4 further comprising converting the single delta lift command into symmetric lateral surface position commands for control surfaces using at least one of a flight control system, an autopilot system, or a computer.

8. The method of claim 7 further comprising communicating the symmetric lateral surface position commands to lateral control surface actuators to move the control surfaces according to the symmetric lateral surface position commands using at least one of the flight control system, the autopilot system, or the computer.

9. The method of claim 1 wherein the criteria comprises a deadzone.

10. The method of claim 1 wherein the criteria comprises a filter.

11. A method for reducing a vertical position error of an aircraft due to a wind gust comprising:

determining a magnitude of a wind gust acting on an aircraft by determining the magnitude of the vertical wind gust acting on the aircraft using an angle of attack rate and determining the magnitude of the longitudinal wind gust acting on the aircraft using a true airspeed rate;

determining if the magnitude of the wind gust is outside a criteria, and if it is doing the following:

converting the magnitude of the wind gust into a delta lift command, defined as a change in lift command;

using the delta lift command in unison with a vertical position feedback elevator control loop to compensate for the wind gust in order to maintain the commanded position of the aircraft.

12. The method of claim 11 wherein the converting the magnitude of the wind gust into the delta lift command, defined as the change in the lift command, further comprises multiplying a vertical wind gust signal and a longitudinal wind gust signal by at least one gain signal to produce two delta lift commands, and summing the two delta lift commands to produce a single delta lift command.

* * * * *